United States Patent
Tsuneki

[19]

[11] Patent Number: 6,038,098
[45] Date of Patent: Mar. 14, 2000

[54] ROTARY HEAD APPARATUS WITH MAGNETIC HEADS HAVING RESPECTIVE GAPS AT AZIMUTH ANGLES WHICH ARE NOT SUBSTANTIALLY EQUAL TO EACH OTHER

[75] Inventor: Keizo Tsuneki, Kanagawa, Japan

[73] Assignee: Sony Corporation, Tokyo, Japan

[21] Appl. No.: 07/966,883

[22] Filed: Oct. 27, 1992

[30] Foreign Application Priority Data

Oct. 29, 1991 [JP] Japan ................................ 3-309903

[51] Int. Cl.[7] ....................................... G11B 5/52
[52] U.S. Cl. ............................. 360/84; 360/76; 360/107
[58] Field of Search ............................. 360/107, 75, 76, 360/77.12, 84, 10.2, 10.3, 21, 64

[56] References Cited

U.S. PATENT DOCUMENTS

| 4,334,252 | 6/1982 | Toriu ................................... 360/104 |
| 4,580,180 | 4/1986 | Murakoshi ............................ 360/84 |
| 4,607,293 | 8/1986 | Okada et al. ......................... 360/21 |

FOREIGN PATENT DOCUMENTS

| 63-78302 | 4/1988 | Japan ................................... 360/76 |
| 4-85705 | 3/1992 | Japan ................................... 360/21 |
| 4-307412 | 10/1992 | Japan ................................... 360/76 |

OTHER PUBLICATIONS

*Magnetic Recording Handbook*, "The Recording and Reproducing Processes", Barry Middleton, 1990, pp. 75–77.

Tenth IEEE Symposium on Mass Storage Systems May 10, 1990, Monterey, California US pp. 46–50 XP000166451 T.C. Wood 'A Survey of DCRSi and D–2 Technology' p. 48, left col., line 1–line 9 figures 6,7; table 1.

IEEE Transactions on Consumer Electronics vol. CE–30, No. 3, Aug. 1984, New York US pp. 360–368 K. Miura et al. 'HIFI VCR System' p. 365.

Patent Abstracts of Japan, vol. 10, No. 74 (P–439) (2131) Mar. 25, 1986 & JP–A–60 211 611 (Hitachi Seisakusho K.K.) Oct. 24, 1985.

*Primary Examiner*—Jefferson Evans
*Attorney, Agent, or Firm*—Frommer Lawrence & Haug, LLP.; William S. Frommer

[57] ABSTRACT

Information signals are recorded on a magnetic tape in parallel tracks that are oriented at an angle from the direction of magnetic orientation of the magnetic tape. Two magnetic heads which perform the recording have respective gaps at azimuth angles which are unequal in magnitude and opposite to each other in polarity. The azimuth angles are selected so that respective reproduction outputs of the magnetic heads are substantially equal and crosstalk between adjacent tracks is reduced below a maximum desired level.

7 Claims, 6 Drawing Sheets

Fig. 1A  Fig. 1B
Fig. 2A  Fig. 2B
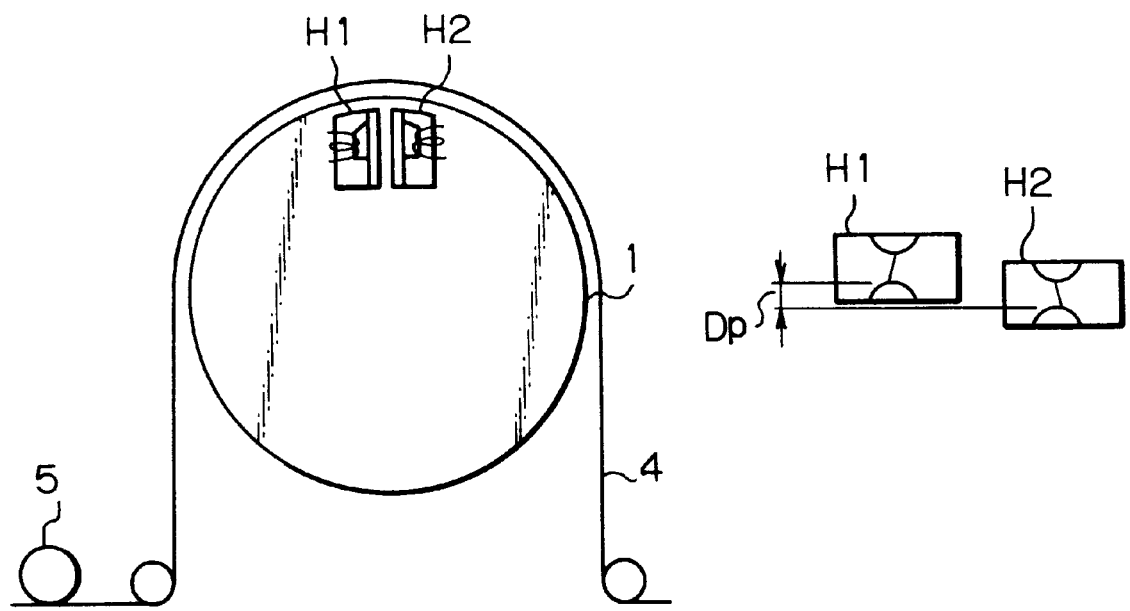
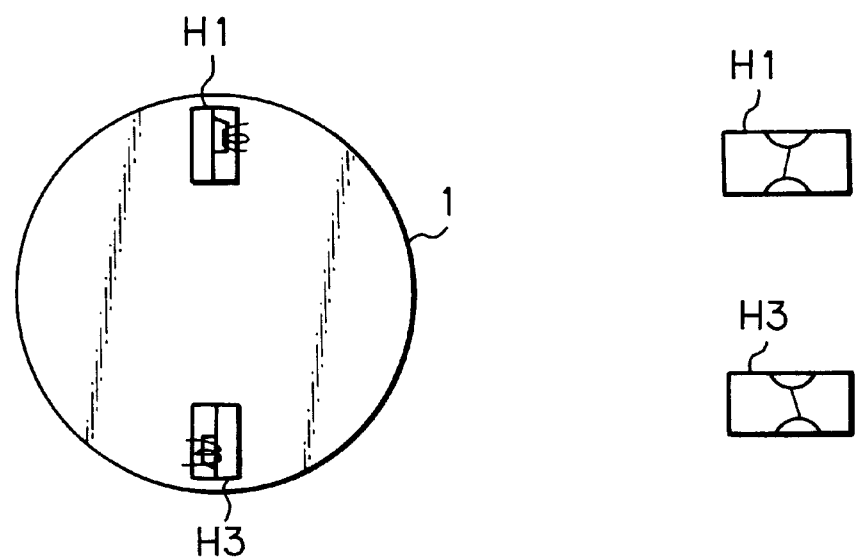

ROTARY HEAD APPARATUS WITH
MAGNETIC HEADS HAVING RESPECTIVE
GAPS AT AZIMUTH ANGLES WHICH ARE
NOT SUBSTANTIALLY EQUAL TO EACH
OTHER

BACKGROUND OF THE INVENTION

1. Field of the Invention

This invention relates to a rotary head apparatus used for helically scanning a magnetic tape for recording and reproduction of signals, and more particularly is directed to such an apparatus that has magnetic heads with gaps at different azimuth angles.

2. Description of the Prior Art

It is known to record information by helically scanning a magnetic tape. For example, a conventional video tape recorder (VTR) that records and/or reproduces a video signal on a magnetic tape is an example of a helical scan type of recorder. In such recorders, it is well known to have two magnetic heads mounted at diametrically opposed positions on a rotary drum for recording respective signal channels. The drum may rotate at a frequency that is equal to the video frame rate. Typically the magnetic tape is obliquely wrapped around the peripheral surface of the rotary drum at an angle which may be, for example, slightly larger than 180°. The two heads alternatively scan the magnetic tape, sequentially forming oblique tracks on the tape as the tape is advanced. The tape is advanced in a longitudinal direction and the oblique tracks are at an angle, known as a "track angle", to the longitudinal direction. A common track angle is about 5°. In this conventional VTR, the video signal for one video field is recorded on each track and includes a frequency modulated luminance signal-and down-converted chrominance signals.

In a known type of VTR, a guard band, which is an area in which no signal is recorded, is provided between adjacent tracks in order to minimize or prevent crosstalk between the adjacent tracks. However, in order to extend the recording capacity of the tape, another type of VTR has been developed in which guard bands have been eliminated and a so-called "azimuth recording" approach is used to suppress crosstalk. In this approach the magnetic heads are arranged so that the head gaps are directed at angles to the head scanning direction. The angle by which the head gap is diverted from the scanning direction is known as the azimuth angle, and it is known to arrange the head gaps to have respective azimuth angles of opposite polarity and the same magnitude. For instance, in a known VTR using 8 mm tape, one head has an azimuth angle of 10° while the other has an azimuth angle of −10°. As a result, so-called "azimuth loss" reduces the crosstalk between adjacent tracks.

It is also known to form a magnetic tape by coating a base film with magnetic particles carried in a binding material. In order to increase the quantity of particles bound onto the base film, it is known to magnetically orient the particles during manufacturing so that the direction of the major axis of each of the particles is aligned in parallel with the longitudinal direction of the tape. As a result, the longitudinal direction of the tape is also a direction of magnetic orientation of the particles carried thereon. The direction of orientation of the particles is also referred to as the direction of magnetic orientation of the tape. When a rather small track angle, such as 5°, is used in forming the recording tracks, the deviation between the track direction and the tape's direction of magnetic orientation is small enough that the recording characteristics of the tape are not significantly affected by such deviation.

However, a small track angle, such as 5°, results in recording tracks that are rather long and which therefore are prone to non-linearity due to disturbances in tape transport speed, drum rotation speed, drum eccentricity and the like. Non-linearity of the recording tracks is particularly disadvantageous when it is desired to use a relatively narrow track. Therefore, it is desirable to increase the track angle, for instance to 10°, so that the length of the track is shortened and the susceptibility to non-linearity reduced. It will be appreciated that using a shorter track requires that the signal for one video field be divided or segmented among a plurality of tracks. However, distribution of a signal for one field among a plurality of tracks is well known and can be readily accomplished. An example of a recording format in which signals for one field are distributed among a plurality of tracks is the 4:2:2 (or D1) format shown at-pages 55 and 56 of *Introduction to the* 4:2:2 *Digital Video Tape Recorder*, by Stephen Gregory (Pentech Press, London, 1988).

Although the increase in the track angle provides advantages in terms of shortening the recording track and so reducing problems caused by non-linearity in the tracks, at the same time the increased track angle entails disadvantages due to the increased divergence between the scanning direction and the tape's direction of magnetic orientation. In particular, when heads having symmetrically inclined azimuth angles of opposite polarities are used, the deviation of the recording track from the direction of magnetic orientation results in asymmetry in the reproduction outputs provided by the respective magnetic heads. Taking the track angle to be $\theta$ and the respective azimuth angles to be $\alpha$ and $-\alpha$, it will be recognized that the angles of inclination of the heads with respect to the tape's direction of magnetic orientation are $\theta-\alpha$ and $\theta+\alpha$, respectively, and are not symmetric. Further, when a magnetic tape of the evaporation deposition type is used rather than the conventional coated tape, the magnetic orientation of the tape is stronger, which enhances the asymmetry of the outputs of the respective heads due to the asymmetric inclinations from the direction of magnetic orientation. As a result, there is dissidence between the reproduction outputs of the respective heads, and the quality of reproduction deteriorates because of noise, flickering and the like.

OBJECTS AND SUMMARY OF THE INVENTION

Accordingly, it is an object of the present invention to provide a rotary head apparatus having heads of different azimuth angles which form tracks on a magnetic tape in a direction inclined from the direction of magnetic orientation of the tape and with substantially equal reproduction outputs from the magnetic heads.

In accordance with an aspect of the present invention, in a rotary head apparatus which records and reproduces information signals on a magnetic tape having a magnetic orientation in a predetermined direction, with the information signals being recorded in a plurality of parallel tracks which are oriented in a track direction that is different from the direction of the magnetic orientation, first and second magnetic heads are mounted on a rotary member so that the heads scan respective adjacent ones of the tracks in the track direction, and the heads have respective gaps at azimuth angles $\alpha$ and $\beta$ which are unequal in magnitude and opposite to each other in polarity. The azimuth angles $\alpha$ and $\beta$ are selected so that respective reproduction outputs of the magnetic heads are substantially equal, while ensuring that crosstalk between adjacent tracks is no greater than a predetermined amount. In a preferred embodiment of the invention, there is an angle of 10° between the track direction and the direction of magnetic orientation of the tape, and the direction of magnetic orientation of the tape is substantially the same as the longitudinal direction in which the tape is advanced.

According to another aspect of the invention, in a rotary head apparatus which records and reproduces information signals on a magnetic tape, as aforesaid, the first and second heads have respective gaps at azimuth angles a and B which satisfy the following condition:

$$f(\theta-\alpha) \times \cos \alpha \approx f(\theta+\beta) \times \cos \beta, \text{ where}$$

θ is an angle between the direction of magnetic orientation and the track direction;

f denotes a relationship between an output of a magnetic head and an inclination of that head from the direction of magnetic orientation;

α, β ≧ 0; and

≈ indicates substantial equality.

With a rotary head apparatus in accordance with the invention, the track angle may be increased in order to have shorter tracks, and dual azimuth recording may be performed in order to suppress crosstalk, while obtaining substantially equal reproduction outputs from the magnetic heads.

The above, and other objects, features and advantages of the present invention will be apparent from the following detailed description thereof which is to be read in conjunction with the accompanying drawings.

BRIEF DESCRIPTION OF THE DRAWINGS

FIGS. 1A, 1B, 2A and 2B are schematic diagrams showing arrangements of magnetic recording heads having different azimuth angles;

DETAILED DESCRIPTION OF THE PREFERRED EMBODIMENTS

Embodiments of the invention will now be described with reference to the drawings. FIGS. 1A and 1B show one example, and FIGS. 2A and 2B show another example, of a head arrangement in which the invention may be applied. As shown in FIG. 1A, heads H1 and H2 are mounted on a rotary drum 1 in very close proximity to each other. Head H1 is for recording and reproducing signals of a channel "A" and head H2 is for recording and reproducing signals of a channel "B". As more clearly shown in FIG. 1B, heads H1 and H2 have different azimuth angles.

Heads H1 and H2 are preferably formed in an integrated construction of the type known as "double azimuth" or "VX" heads. As shown in FIG. 1B, heads H1 and H2 are mounted so that there is a small difference $D_p$ in height between them. The height difference $D_p$ is selected to be equal to the track pitch. Referring again to FIG. 1A, a magnetic tape 4 is helically wound around the peripheral surface of rotary drum 1 with a wrapping angle of, for example, 166°. A tape drive mechanism such as capstan 5 is provided for advancing tape 4.

Rotary drum 1 rotates rapidly in relation to the speed of advancement of tape 4. During a period of time when heads H1 and H2 are simultaneously scanning the tape, respective digital recording signals are simultaneously supplied to heads H1 and H2 so that two adjacent tracks are formed by the respective heads as the heads together make one scan obliquely across tape 4.

FIG. 2A illustrates an alternative head arrangement, in which heads H1 and H3 are mounted on rotary drum 1 at diametrically opposite locations. Head H1 is for recording and reproducing signals of channel "A" and Head H3 is for recording and reproducing signals of channel "B". In the head arrangement shown in FIG. 2A the magnetic tape (not shown in FIG. 2A) is helically wound around the peripheral surface of drum 1 at a wrapping angle that is slightly larger than 180°.

As shown in FIG. 2B, heads H1 and H3 have different azimuth angles. It should be understood that with rotation of drum 1, heads H1 and H3 alternately scan the magnetic tape.

The present invention is applicable to either of the head arrangements shown in FIGS. 1A and 2A, but the arrangement of FIG. 1A is preferred because that arrangement tends to minimize differences in the linearity of adjacent tracks due to drum vibration and the like. It should be understood that the present invention is also applicable to rotary head drum arrangements in which three or more heads are mounted on the drum.

In accordance with the invention, heads H1 and H2 (or H3, as the case may be) have respective azimuth angles −α and β where α and β are unequal (α, β ≧ 0), and are selected so that the respective reproduction outputs of the two heads are substantially equal.

Figure 3:
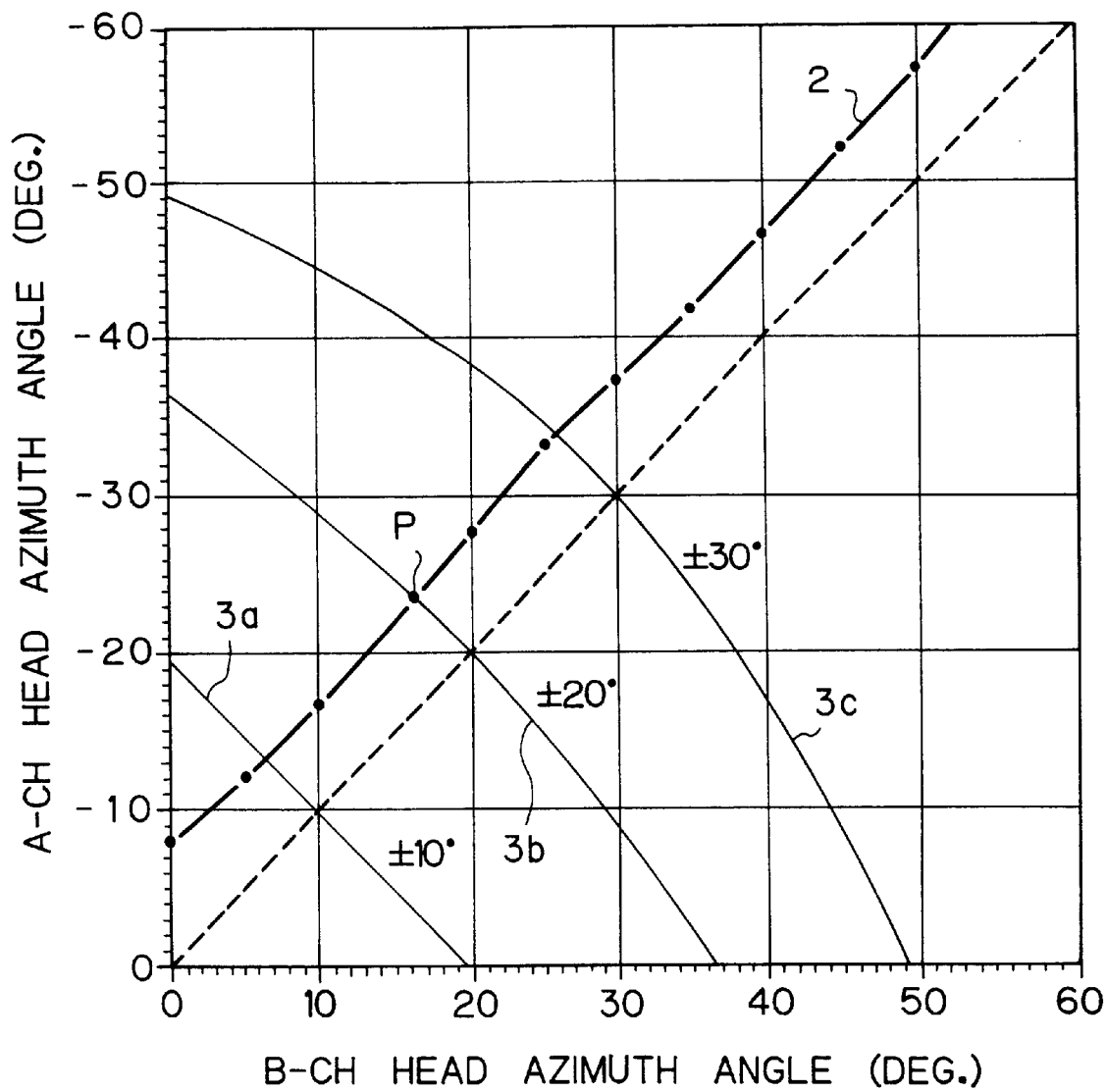
FIG. 3 is a graphical representation of optimum azimuth angles of respective magnetic heads in accordance with the invention.

Referring to FIG. 3, a curve indicated by reference numeral 2 shows the optimum values of the respective azimuth angles of the A channel head (head H1) and the B channel head (head H2 or H3) for given desired levels of crosstalk suppression.

Figure 4:
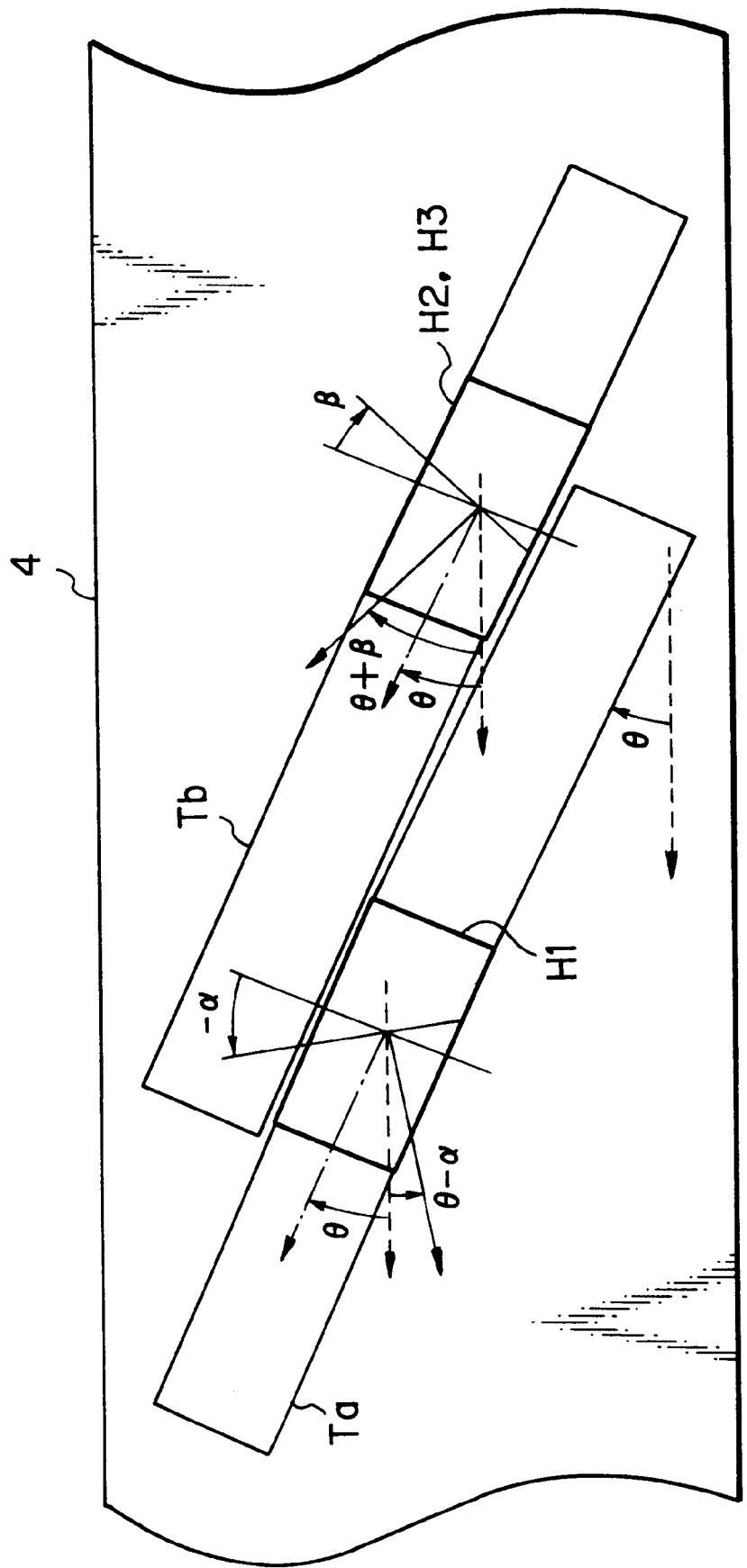
FIG. 4 is a schematic diagram showing selection of azimuth angles for respective recording heads in accordance with the invention.

The data shown on FIG. 3 is obtained by using a head azimuth angle arrangement that is schematically illustrated on FIG. 4.

In FIG. 4, magnetic tape 4 has formed thereon a track Ta that is formed by A channel head H1 and track Tb formed by B channel head H2 or H3. Tracks Ta and Tb are inclined at a track angle θ from the longitudinal direction of tape 4, which is also the direction of magnetic orientation of tape 4. The azimuth angle of head H1 is −α and the azimuth angle of head H2 (or H3 as the case may be) is β. Accordingly, the respective angles of the inclination of the heads from the magnetic orientation direction of the tape are Θ−α and Θ+β.

Figure 5:
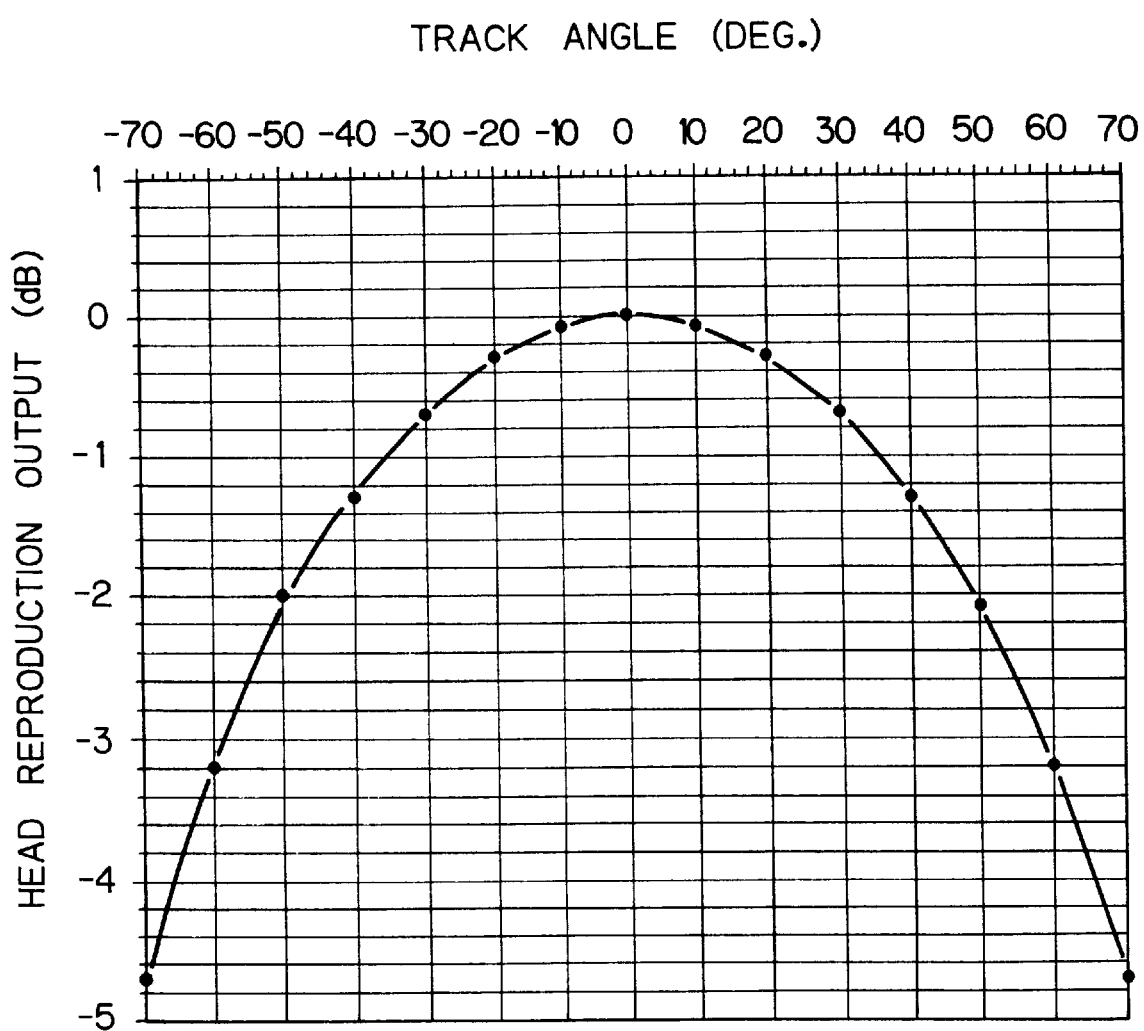
FIG. 5 graphically illustrates a relationship between head reproduction output and track angle when a 0° azimuth angle (no azimuth angle) is used.
Figure 6:
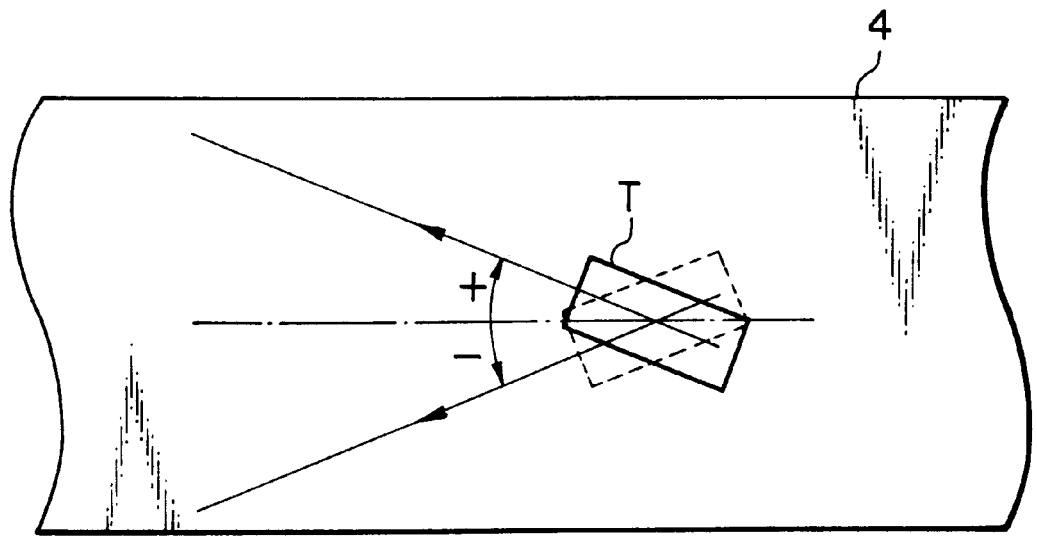
FIG. 6 is a schematic illustration used in explaining the effect of track angle on head reproduction output.

FIGS. 5 and 6 illustrate a relationship between head output and inclination of a magnetic head from a tape's direction of magnetic orientation in the case of a magnetic tape of the evaporation deposition type. In FIG. 6 a magnetic tape 4 is shown with a track T having a track angle that is varied among a number of positive and negative angles with respect to the longitudinal direction of the tape 4, which is also the direction of magnetic orientation of the tape 4. Assuming that the head has an azimuth angle of 0° and a signal of a predetermined recording wavelength is recording and subsequently reproduced, the relationship between head reproduction output and track angle is illustrated by the curve shown in FIG. 5. This relationship may be expressed in the following equation:

$$e_{out} = f(H)$$

where $e_{out}$ is the level of reproduction output, H is the angle of inclination of the head from the tape's direction of magnetic orientation and f is the relationship therebetween as graphically illustrated in FIG. 5.

It will be noted that the graph of the relationship f is symmetrical around a central value of the track angle that is equal to 0°.

Figure 8:
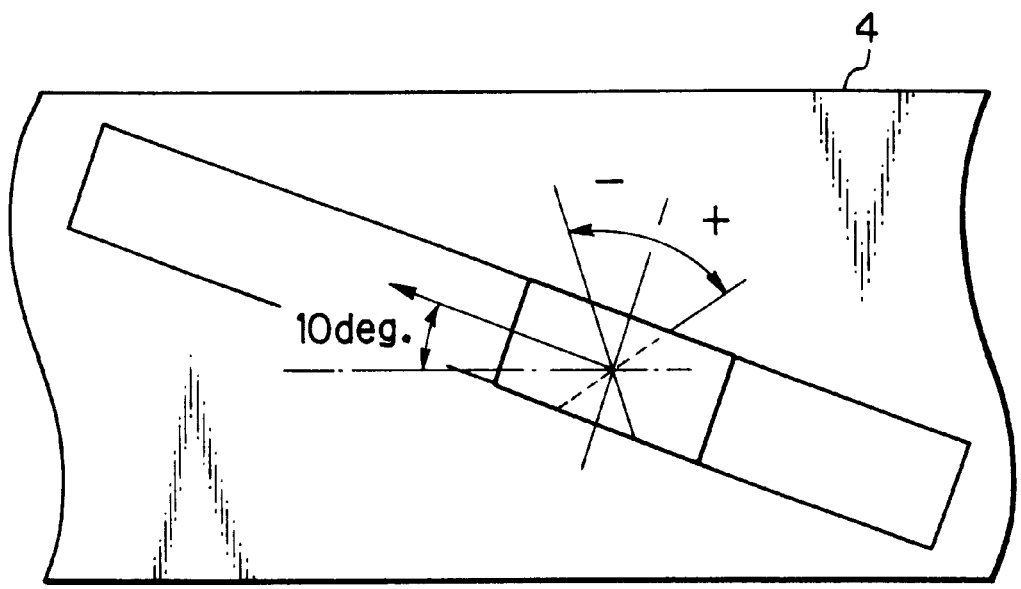
FIG. 8 is a schematic diagram used to explain the relationship between azimuth angle and head reproduction output when a 10° track angle is used.
Figure 7:
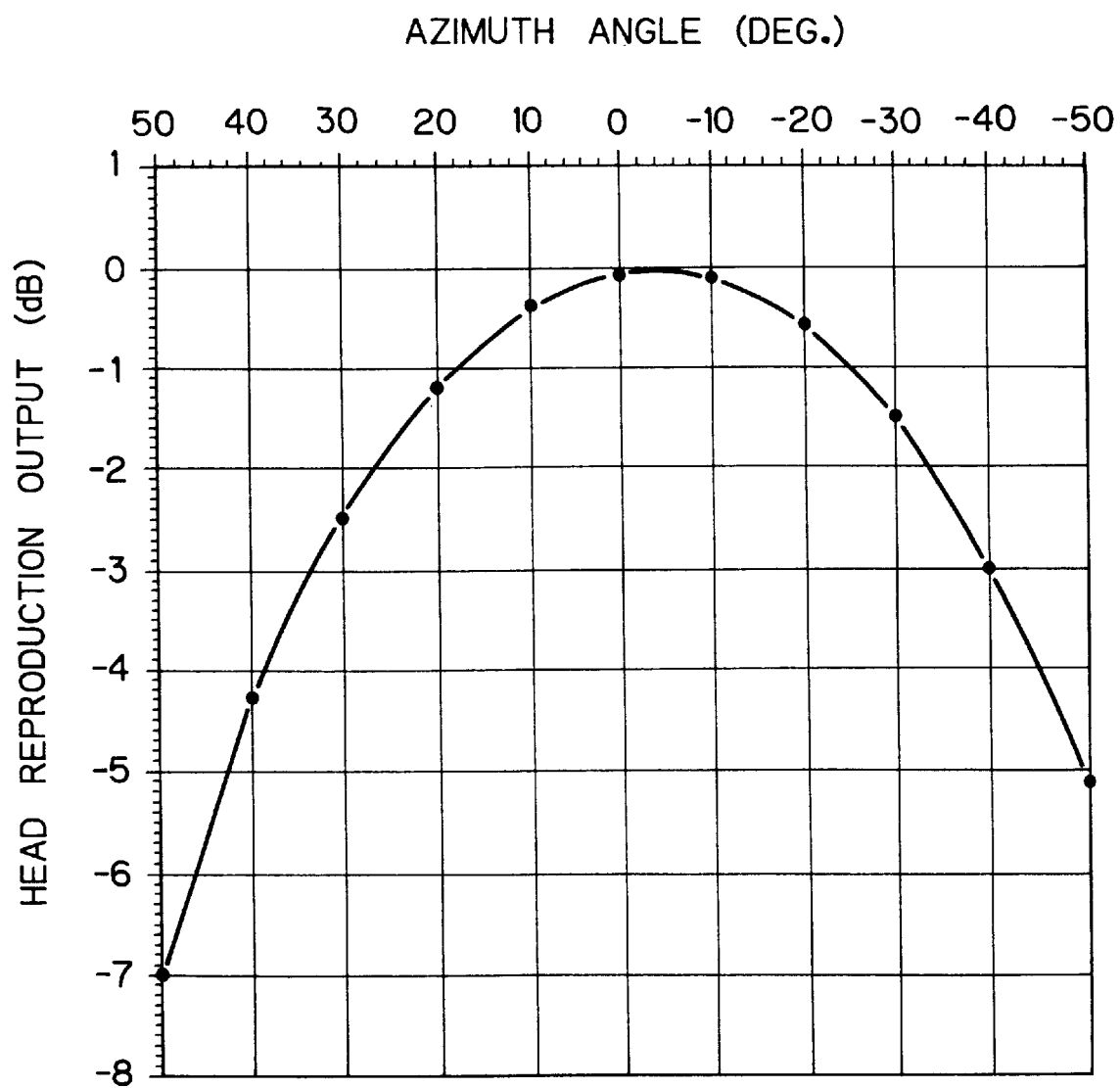
FIG. 7 is a graphical illustration of a relationship between azimuth angle and head reproduction output when a 10° track angle is used.

FIGS. 7 and 8 illustrate a relationship between azimuth angle and head reproduction output when a fixed track angle of 10° is used with varying head azimuth angles.

It is to be noted that using a non-zero azimuth angle affects both the angle of inclination of the head relative to the tape's direction of magnetic orientation and also the effective relative speed of the head gap with respect to tape 4. Both the effective relative speed and the angle of inclination, in turn, affect the level of head reproduction output. Thus the inclination of head H1 (FIG. 4) is given by $\Theta - \alpha$, and the loss due to the azimuth angle is proportional to cos a because the effective relative speed of the head is given by $V_h \times \cos \alpha$, where $V_h$ is the head's scanning speed. Accordingly, the reproduction output for the A channel can be expressed as:

$$e_{out} \text{ (A channel)} = f(\theta - \alpha) \times \cos \alpha \qquad (1)$$

Similarly, the reproduction output for the B channel is given by $$e_{out} \text{ (B channel)} = f(\theta + \beta) \times \cos \beta \qquad (2)$$

As shown in FIG. 7, when a 10° track angle is used in recording on an evaporation deposition tape, the amount of head reproduction loss is not symmetrical with changes in azimuth angle if a 0° azimuth is used as a center value. In other words, if a substantial and symmetrical difference in azimuth angles is selected such as, for example −20° for the A channel head and +20° for the B channel head, in order to obtain a substantial suppression of crosstalk, there is a relatively large difference between the respective levels of reproduction output of the heads. In order to make the outputs substantially equal, it will be recognized from equations (1) and (2) above that the following condition is to be satisfied:

$$f(\theta - \alpha) \times \cos \alpha = f(\theta + \beta) \times \cos \beta$$

Curve 2 of FIG. 3 illustrates appropriate respective azimuth angle values to be selected in order to achieve this relationship.

Selection of respective azimuth angles also depends on how much crosstalk suppression is desired. Referring again to FIG. 3, curves 3a, 3b and 3c each connect points representing respective equal levels of crosstalk suppression. Thus, curve 3a shows values of the respective azimuth angles which provide crosstalk suppression equivalent to that provided when the heads have respective azimuth angles −10° and +10, curve 3b indicates crosstalk suppression levels equivalent to that provided by −20° and +20° azimuth angles, and curve 3c indicates azimuth angles that may be selected to obtain crosstalk suppression equivalent to that produced by −30° and +30° azimuth angles. For example, if it is desired to suppress crosstalk to the same extent as an arrangement in which $\alpha = \beta = 20°$ (i.e., head H1 has an azimuth angle of −20° and H2 has an azimuth angle of +20°), but with each head having an equal level of reproduction output, then the respective azimuth angles are to be selected as indicated by point P, at the intersection of curves 2 and 3b. As indicated by point P, the proper selections are $\alpha \approx 23°$ and $\beta = 16°$ so that the azimuth angle of head H1 is approximately −23° and the azimuth angle of head H2 is +16°.

It will understood that other points on curve 2 indicate other possible sets of azimuth angles to be selected for heads H1 and H2 (or H3) with larger or smaller amounts of crosstalk suppression, but in each case with a substantially equal reproduction output for each of the heads.

Having described specific preferred embodiments of the present invention with reference to the accompanying drawings, it is to be understood that the invention is not limited to the precise embodiments, and that various changes and modifications maybe effected therein by one skilled in the art without departing from the scope or spirit of the invention as defined in the appended claims.

What is claimed is:

1. A rotary head apparatus for recording and reproducing information signals on a magnetic tape which has a magnetic orientation in a predetermined direction, the information signals being recorded in a plurality of parallel tracks which are oriented in a track direction different from said direction of the magnetic orientation, the apparatus comprising:

a rotary member; and first and second magnetic heads mounted on said rotary member and scanning respective adjacent ones of said tracks in said track direction, said magnetic heads having respective gaps at azimuth angles $\alpha$ and $\beta$ which are not substantially equal to each other in magnitude and which are opposite to each other in polarity, said azimuth angles being selected such that respective reproduction outputs of said magnetic heads are substantially equal.

2. A rotary head apparatus according to claim 1; wherein said azimuth angles $\alpha$ and $\beta$ are selected such that crosstalk between adjacent tracks is no greater than a predetermined amount.

3. A rotary head apparatus according to claim 1; wherein said track direction and said direction of the magnetic orientation form an angle of 10°.

4. A rotary head apparatus according to claim 1; wherein said direction of the magnetic orientation of said magnetic tape is substantially the same as a longitudinal direction in which said magnetic tape is advanced.

5. A rotary head apparatus for recording and reproducing information signals on a magnetic tape which has a magnetic orientation in a predetermined direction, the information signals being recorded in a plurality of parallel tracks which are oriented in a track direction different from said direction of the magnetic orientation, the apparatus comprising:

a rotary member; and first and second magnetic heads mounted on said rotary member and scanning respective adjacent ones of said tracks in said track direction, said magnetic heads having respective gaps at azimuth angles $\alpha$ and $\beta$ which are not substantially equal to each other in magnitude and which satisfy the following condition so that respective reproduction outputs of said magnetic heads are substantially equal:

$f(\Theta-\alpha)\times\cos\alpha \approx f(\Theta+\beta)\times\cos\beta$, where $\Theta$ is an angle between said direction of the magnetic orientation and said track direction;

f denotes a relationship between an output of a magnetic head and an inclination of said magnetic head from said direction of the magnetic orientation;

$\alpha, \beta \geqq 0$; and $\approx$ indicates substantial equality.

6. A rotary head apparatus according to claim 5, wherein $\theta=10°$.

7. A rotary head apparatus according to claim 5; wherein said direction of the magnetic orientation of said magnetic tape is substantially the same as a longitudinal direction in which said magnetic tape is advanced.

* * * * *